(12) United States Patent
Plüss

(10) Patent No.: US 11,726,052 B2
(45) Date of Patent: Aug. 15, 2023

(54) CAPACITIVE SENSOR

(71) Applicant: Sensirion AG, Stäfa (CH)

(72) Inventor: Marcel Plüss, Stäfa (CH)

(73) Assignee: Sensirion AG, Stäfa (CH)

( * ) Notice: Subject to any disclaimer, the term of this patent is extended or adjusted under 35 U.S.C. 154(b) by 46 days.

(21) Appl. No.: 17/431,480

(22) PCT Filed: Feb. 19, 2020

(86) PCT No.: PCT/EP2020/054379
§ 371 (c)(1),
(2) Date: Aug. 17, 2021

(87) PCT Pub. No.: WO2020/169676
PCT Pub. Date: Aug. 27, 2020

(65) Prior Publication Data
US 2022/0136991 A1 May 5, 2022

(30) Foreign Application Priority Data

Feb. 21, 2019 (EP) .................................. 19158447

(51) Int. Cl.
*G01R 27/26* (2006.01)
*G01N 27/22* (2006.01)
*G01D 5/24* (2006.01)

(52) U.S. Cl.
CPC ............. *G01N 27/223* (2013.01); *G01D 5/24* (2013.01); *G01N 27/221* (2013.01); *G01N 27/226* (2013.01); *G01N 27/228* (2013.01)

(58) Field of Classification Search
CPC .................................................... G01R 27/26
(Continued)

(56) References Cited

U.S. PATENT DOCUMENTS 7,030,630 B2   4/2006   Haas et al.
7,032,448 B2   4/2006   Hamamoto
(Continued)

FOREIGN PATENT DOCUMENTS

DE   202013105955 U1   2/2014
JP   1985080751 A      5/1985

OTHER PUBLICATIONS

Qiu Y Y et al, "A CMOS humidity sensor with on-chip calibration", Sensors and Actuators A: Physical, Elsevier BV, NL, vol. 92, No. 1-3, Aug. 1, 2001 (Aug. 1, 2001), p. 80-87, XP004274028 DOI: 10.1016/S0924-4247(01)00543-X external link ISSN:0924-4247.
(Continued)

*Primary Examiner* — Vincent Q Nguyen
(74) *Attorney, Agent, or Firm* — Renner, Otto, Boisselle & Sklar, LLP

(57) ABSTRACT

A capacitive sensor includes a substrate and an electrode structure including at least a first electrode, a second electrode and a sensing layer arranged between the first electrode and the second electrode. The sensor further includes a measurement circuit configured to measure the capacitance of the electrode structure by applying, at a first measurement phase, a first pair of electrical potentials including a first electrical potential of the first electrode and a first electrical potential of the second electrode to the first electrode and the second electrode by applying, at a second measurement phase, a second pair of electrical potentials including a second electrical potential of the first electrode and a second electrical potential of the second electrode to the first electrode and the second electrode. The first electrical potential of the second electrode and the second electrical potential of the second electrode are different from each other.

16 Claims, 8 Drawing Sheets

(58) Field of Classification Search
USPC .................... 324/658, 660–663, 679, 686
See application file for complete search history.

(56) References Cited

U.S. PATENT DOCUMENTS

| | | | |
|---|---|---|---|
| 7,267,002 | B2 | 9/2007 | Nippon |
| 3,030,949 | A1 | 10/2011 | Gotz |
| 9,696,272 | B2 | 7/2017 | Ledwosinska et al. |
| 9,753,002 | B2* | 9/2017 | Hebert ................. G01N 27/223 |
| 10,746,683 | B2* | 8/2020 | Cummins .......... G01R 27/2605 |
| 2008/0024110 | A1 | 1/2008 | Nikolaus |
| 2008/0224195 | A1* | 9/2008 | Wang ..................... H01L 28/57 |
| | | | 257/295 |
| 2011/0180884 | A1 | 7/2011 | Lazarus |

OTHER PUBLICATIONS

G Narmadha et al, "Capacitive Fringing Field Sensor Design for Moisture Measurement", Jan. 1, 2012 (Jan. 1, 2012),Retrieved from the Internet: URL:https://pdfs.semanticscholar.org/2b91/a341e9d65d052e9a4104169081845d8d9c4.pdf XP055613846.

* cited by examiner

CAPACITIVE SENSOR

This application is a national phase of International Application No. PCT/EP2020/054379 filed Feb. 19, 2020, which claims priority to EP Application No. 19158447.3, filed Feb. 21, 2019, the entire disclosures of which are hereby incorporated by reference.

TECHNICAL FIELD

The disclosure relates to a capacitive sensor, in particular a capacitive humidity sensor, a capacitive gas sensor and a capacitive particulate matter sensor. Further aspects of the disclosure relate to a method for capacitive sensing, in particular for capacitive humidity sensing.

BACKGROUND ART

Capacitive sensors may be embodied e.g. as humidity sensors, in particular as sensors for sensing the relative humidity of the environmental air, are widely used in environmental sensing applications.

One type of humidity sensors are capacitive humidity sensors which comprise one or more humidity sensitive layers, in particular a polymer layer, which are arranged between two electrodes and interact with the environmental air. The measured capacity between the two electrodes correlates to the humidity of the environmental air and hence establishes a measure for the humidity.

One problem of capacitive humidity sensors is that the environment of the sensing layer may not be well defined. In particular, the impedance of the environment may change in an uncontrolled manner. As an example, in case of condensation of water or another liquid on the humidity sensitive layer or by a contamination of the humidity sensitive layer with particles, the measured capacity may drop below 100%. Such a saturation event may lead to false measurements. In particular, a corresponding sensor may not be able to differentiate between a condensation scenario and a scenario according to which the relative humidity is indeed a bit below 100%.

DISCLOSURE OF THE INVENTION

Accordingly, one problem to be solved by the present invention is therefore to provide a capacitive sensor with an improved sensitivity range, in particular a humidity sensor that is able to detect condensation scenarios.

According to an embodiment of a first aspect of the invention there is provided a capacitive humidity sensor comprising a substrate and an electrode structure. The electrode structure comprises at least a first electrode and a second electrode and a sensing layer arranged between the first electrode and the second electrode. The sensing layer may have in particular a humidity sensitive permittivity and may hence be embodied as humidity sensitive layer. The sensor further comprises a measurement circuit configured to measure the capacitance of the electrode structure by applying, at a first measurement phase, a first pair of electrical potentials to the first electrode and the second electrode. The first pair of electrical potentials comprises a first electrical potential of the first electrode and a first electrical potential of the second electrode. The measurement circuit is further configured to apply, at a second measurement phase, a second pair of electrical potentials to the first electrode and the second electrode. The second pair of electrical potentials comprises a second electrical potential of the first electrode and a second electrical potential of the second electrode. The embodiment of the first aspect is in particular characterized in that the first electrical potential of the second electrode and the second electrical potential of the second electrode are different from each other. According to the embodiment of the first aspect the first pair of electrical potentials and the second pair of electrical potentials are applied such that they comply at least with one of the conditions as follows:

$$0 <= (V_{A1} - V_{A2}) <= (V_{B2} - V_{B1}) * C_{BE} / C_{AE};$$ (Inequality 1)

or $$(V_{B2} - V_{B1}) * C_{BE} / C_{AE} <= (V_{A1} - V_{A2}) <= 0.$$ (Inequality 2)

In the above formulas/conditions $V_{A1}$ denotes the first electrical potential of the first electrode at the first measurement phase and $V_{A2}$ denotes the second electrical potential of the first electrode at the second measurement phase. Furthermore, $V_{B1}$ denotes the first electrical potential of the second electrode at the first measurement phase and $V_{B2}$ denotes the second electrical potential of the second electrode at the second measurement phase. $C_{AE}$ is the mutual capacitance between the first electrode and a virtual electrode arranged on the surface of the sensing layer, while $C_{BE}$ is the capacitance between the second electrode and the virtual electrode arranged on the surface of the sensing layer.

Such an embodied capacitive sensor is configured to measure the capacitance of its electrode structure by means of a 2-phase measurement. The 2-phase measurement encompasses a first measurement phase and a second measurement phase during which a specific set of electrical potentials is applied to the first electrode and the second electrode. In particular, the first electrical potential of the second electrode and the second electrical potential of the second electrode are different from each other. In other words, the electrical potential of the second electrode changes between the first measurement phase and the second measurement phase. This is in contrast to prior art sensors where the electrical potential of the second electrode is kept constant to avoid that parasitic capacitances between the second electrode and ground or other reference potentials are measured. Such an embodied sensor provides the advantage that the different electrical potentials of the second electrode may be advantageously used to adapt the sensor functionality for specific measurement scenarios.

In particular, investigations of the applicant have shown that by changing the electrical potential of the second electrode between the two measurement phases, sensors according to embodiments of the invention may be designed in such a way that a condensation on the surface of the sensing layer and/or a contamination of the sensing layer does not result in false measurements.

The virtual electrode may be considered as an electrode that is used to define and/or measure the capacitances $C_{AE}$ and $C_{BE}$ or more particularly the quotient $C_{AE}/C_{BE}$. The virtual electrode is arranged on the surface of the sensing layer. The surface of the sensing layer is the area of the sensing layer that is adjacent to the environmental air. In other words, the surface of the sensing layer provides an interface to the environmental air and interacts with the environmental air.

It should be noted that the virtual electrode is not physically present during the sensing operation of the sensor. According to embodiments the virtual electrode may be applied on the surface of the sensing layer of a sample sensor to determine the quotient $C_{AE}/C_{BE}$ or it may be used to determine the quotient $C_{AE}/C_{BE}$ by means of a simulation.

The quotient $C_{BE}/C_{AE}$ may be determined in several different ways or methods as generally known to a skilled person in the art.

According to an embodiment, the quotient $C_{BE}/C_{AE}$ may be determined by a simulation according to the finite element method (FEM). For such a simulation, commercially available programs may be used, e.g. the Comsol Multiphysics® software.

According to embodiments, the FEM simulation derives the quotient $C_{BE}/C_{AE}$ by simulating the geometry of the electrode structure comprising the first electrode, the second electrode and the virtual electrode. According to embodiments, the quotient $C_{BE}/C_{AE}$ depends only on the geometry of the electrode structure, assuming that the permittivity of the dielectric material between the electrode structure is homogenous.

In the case of a symmetric electrode structure, the quotient $C_{BE}/C_{AE}=1$.

According to other embodiments, the quotient $C_{BE}/C_{AE}$ may be determined by measurement, e.g. by measurements using a capacitive voltage divider formed by the capacitances $C_{AE}$ and $C_{BE}$. For such a measurement the virtual electrode may be provided as real electrode or in other words physically on the surface of the sensing layer, e.g. by applying a conductive layer on the surface of the sensing layer.

It should be noted that in order to ensure that the above mentioned conditions (inequality 1 and 2) are fulfilled, it is not necessary according to embodiments to determine the quotient $C_{BE}/C_{AE}$ in a precise manner. Rather, one may perform a rough estimation of the quotient and choose then in the inequality as mentioned above the first and second pair of electrical potentials in such a way that also in the worst case of the rough estimation the inequality is fulfilled.

According to embodiments, the geometry of the electrode structure remains constant and does not change during the measurement.

According to embodiments, the measured capacitance depends on a property or characteristic of the sensing layer, in particular on a property or characteristic of the material of the sensing layer, in particular on the permittivity of the sensing layer.

According to embodiments, the first pair of electrical potentials and the second pair of electrical potentials are chosen such that leakage currents between the surface of the sensing layer and electrical structures surrounding the surface of the sensing layer are reduced, in particular minimized, in particular in case of a contamination of the surface of the sensing layer or in case of a condensation on the surface of the sensing layer.

Such electrical structures may be generally any electrical structures surrounding the sensing layer. The electrical structures may be in particular an electrical housing and/or electrical lines or electrical circuits of the sensors arranged in the neighbourhood of the sensing layer.

According to embodiments, intermediate electrical potentials of the first electrode and of the second electrode between the first measurement phase and the second measurement phase may have any arbitrary shape, in particular a rectangular shape or a sinusoidal shape.

According to embodiments, the first pair of electrical potentials and the second pair of electrical potentials are applied such that they comply at least with one of the conditions as follows:

$$0<(V_{A1}-V_{A2})<(V_{B2}-V_{B1})*C_{BE}/C_{AE} \qquad \text{(Inequality 3)}$$

or $$(V_{B2}-V_{B1})*C_{BE}/C_{AE}<=(V_{A1}-V_{A2})<0. \qquad \text{(Inequality 4)}$$

According to such an embodiment, the first electrical potential of the first electrode and the second electrical potential of the first electrode are also different from each other. This increases the resulting charge difference between the first measurement phase and the second measurement phase.

According to embodiments, the first pair of electrical potentials and the second pair of electrical potentials are applied such that they comply with the condition as follows:

$$(V_{A1}-V_{A2})=(V_{B2}-V_{B1})*C_{BE}/C_{AE}$$

According to embodiments, the first electrical potential of the first electrode and the second electrical potential of the first electrode are different from each other and the first electrical potential of the second electrode and the second electrical potential of the second electrode are different from each other.

By changing the electrical potentials of both electrodes, the sensing signal, in particular the sensed current, of the measurement circuit may be increased.

According to embodiments, the average electrical potential of the first pair of electrical potentials is the same as the average electrical potential of the second pair of electrical potentials. This embodiment is in particular suited for sensors having a symmetric electrode structure, i.e. electrode structures according to which the first electrode and the second electrode are arranged symmetrically with respect to the sensing layer and hence have the same distance to the sensing layer. Hence the capacitance $C_{AE}$ between the first electrode and the environment and the capacitance $C_{BE}$ between the second electrode and the environment have the same value.

Embodiments of the invention are based on an insight of the inventors of the present invention that in case of condensation the impedance between the surface of the sensing layer and external electrical structures surrounding the surface of the sensing layer are not infinite anymore and that this may result in a loss of current via this impedance. As a result, this loss of current reduces the current in the second electrode and hence without countermeasures a sensor may not be able to differentiate a condensation scenario from a humidity scenario of less than 100% humidity.

Sensors according to embodiments of the invention avoid by a smart choice of pairs of electrical potentials that current is lost to external electrical structures in case of condensation or other contaminations of the surface of the sensing layer. This facilitates the measurement circuit to differentiate between the two scenarios.

According to an embodiment, the measurement circuit may be in particular configured to sense a resulting charge difference between the first measurement phase and the second measurement phase at the second electrode. Accordingly, the measurement circuit evaluates the charge difference which accumulates between the first measurement phase and the second measurement phase. In other words, the measurement circuit compares an initial state (charge state at the end of the first measurement phase) with a final state (charge state at the end of the second measurement phase). However, the run of the charging cycles as such does not need to be considered.

As mentioned above, according to embodiments the total capacitance between the first electrode and the second electrode is larger in case of condensation than in cases without condensation. Accordingly, the resulting charge difference measured by a measurement circuit according to embodiments of the invention increases in case of condensation.

According to an embodiment, the measurement circuit is configured to transfer the resulting charge difference to a reference capacitor and to measure a resulting voltage at the reference capacitor. According to an embodiment, the measurement circuit is further configured to determine the capacitance of the sensing layer from the resulting voltage.

This is an efficient and reliable way to convert the resulting charge difference into a voltage that can be measured. As the capacitance of the reference capacitor is known, the capacitance of the sensing layer may be derived from the reference capacitance, the resulting voltage and the electrical potentials applied during the first and the second measurement phase.

According to an embodiment, the measurement circuit comprises an offset capacitor and the measurement circuit is configured to subtract an offset charge from the resulting charge difference.

Such an embodiment may be used to transfer a charge to the reference capacitor that is symmetric to 0.

According to an embodiment, the measurement circuit comprises an integrator, in particular a switched capacitor amplifier. The switched capacitor amplifier is configured to integrate the resulting charge difference or in other words to integrate the current flowing through the second electrode when switching from the first measurement phase to the second measurement phase.

According to an embodiment, the integrator, in particular the switched capacitor amplifier, is embodied as operational amplifier. Such a switched capacitor amplifier circuit may be implemented and fabricated in an efficient way.

According to an embodiment, the first electrical potential of the first electrode is the same as the second electrical potential of the second electrode and the second electrical potential of the first electrode is the same as the first electrical potential of the second electrode.

Such a simplified set of electrical potentials with only two different voltages facilitates an efficient design and fabrication of the measurement circuit.

In particular, the first electrical potential of the first electrode and the second electrical potential of the second electrode are supply voltage potentials and the first electrical potential of the second electrode and the second electrical potential of the first electrode are ground potentials or the first electrical potential of the first electrode and the second electrical potential of the second electrode are ground potentials and the first electrical potential of the second electrode and the second electrical potential of the first electrode are supply voltage potentials.

Such a simplified set of electrical potentials facilitates an efficient design and fabrication of the measurement circuit, in particular as ground and supply voltage potentials of a corresponding integrated circuit may be used and no further voltage generation or voltage conversion is needed.

According to an embodiment, the sensor comprises a first metal layer comprising the first electrode and the second electrode and a second metal layer comprising a shielding structure. The shielding structure may comprise a plurality of shielding electrodes.

The shielding structure performs a shielding of electromagnetic fields. In addition, such a shielding structure may provide an etch stop and hence facilitates an efficient fabrication of the sensor.

According to an embodiment, the shielding structure is electrically coupled to a ground potential.

According to such an embodiment the parasitic capacitance between the second electrode and ground is measured.

According to an embodiment, the shielding structure is electrically coupled to the first electrode.

According to such an embodiment the parasitic capacitance between the second electrode and ground is measured with a factor of two.

According to an embodiment, the shielding structure is electrically coupled to the second electrode.

According to such an embodiment, the parasitic capacitance between the second electrode and ground is not measured.

According to an embodiment of another aspect of the invention, a method for performing a capacitance measurement is provided. The method comprises steps of providing an electrode structure comprising at least a first electrode, a second electrode and a sensing layer arranged between the first electrode and the second electrode. The method comprises further steps of measuring the capacitance of the electrode structure by applying, at a first measurement phase, a first pair of electrical potentials to the first electrode and the second electrode and by applying, at a second measurement phase, a second pair of electrical potentials to the first electrode and the second electrode.

The first pair of electrical potentials comprises a first electrical potential of the first electrode and a first electrical potential of the second electrode. The second pair of electrical potentials comprises a second electrical potential of the first electrode and a second electrical potential of the second electrode. The first electrical potential of the second electrode and the second electrical potential of the second electrode are different from each other.

According to an embodiment, the method further comprises sensing a resulting charge difference between the first measurement phase and the second measurement phase at the second electrode and transferring the resulting charge difference to a reference capacitor. In addition, the method may comprise steps of measuring a resulting voltage at the reference capacitor and determining the capacitance of the electrode structure from the resulting voltage.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
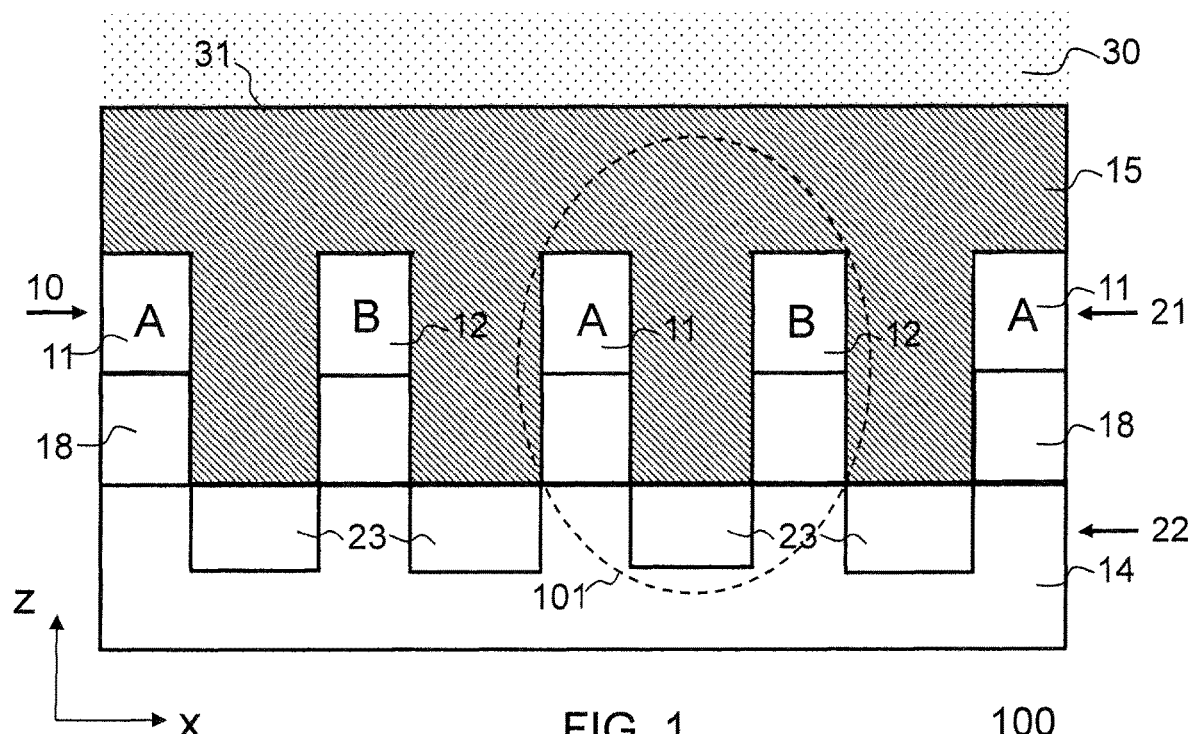
FIG. 1 shows a cross sectional view of a capacitive humidity sensor according to an embodiment of the invention.

FIG. 1 shows a cross sectional view of a capacitive sensor 100 according to an embodiment of the invention. The capacitive sensor 100 may be in particular embodied as humidity sensor and comprises an electrode structure 10 comprising first electrodes 11 and second electrodes 12. In this example the sensor 100 comprises three first electrodes 11 and two second electrodes 12. A sensing layer 15 is arranged between the first electrodes 11 and the second electrodes 12. The first electrodes 11 are also denoted as electrodes A and the second electrodes 12 are also denoted as electrodes B. The electrode structure 10 forms a first or top metal layer 21. The sensing layer 15 has a humidity sensitive permittivity and hence the electrode structure 10 has a humidity sensitive capacitance and may comprise or consist of a polymer. The sensing layer 15 extends between the first electrodes 11 and the second electrodes 12 and is illustrated with a diagonal pattern. The sensor 100 further comprises dielectric layers 18 which provide an electrical insulation between the first metal layer 21 and a second metal layer 22. The second metal layer 22 may be also denoted as second last metal layer. The second metal layer 22 comprises a plurality of electrodes 23, which may be in particular electrically coupled to a ground potential and accordingly denoted as ground electrodes. The second metal layer 22 forms a shielding structure 22. According to other embodiments the second metal layer 22, in particular the electrodes 23, may be coupled to the first electrode 11 or the second electrode 22.

The sensor 100 comprises a base substrate 14 on which the second metal layer 22, the dielectric layers 18, the first metal layer 21 and the sensing layer 15 are formed. The base substrate 14 may be in particular a semiconductor substrate, e.g. a Si-substrate.

Figure 2:
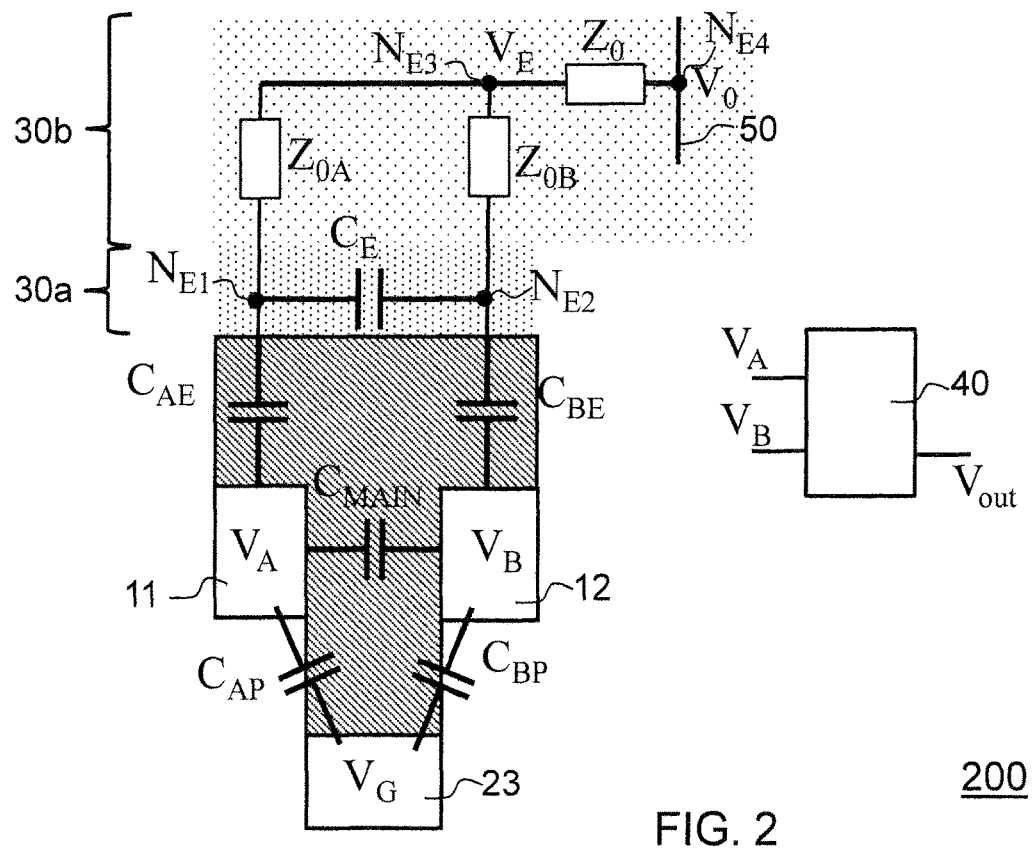
FIG. 2 shows a partial cross sectional view of the humidity sensor of FIG. 1 including a schematic illustration of the capacitances involved in measurement approaches according to embodiments of the invention.

The sensing layer 15 has a surface 31 to a sensing environment 30. The sensing environment 30 may be a gas surrounding the sensor, in particular the environmental air. The sensing environment 30 is illustrated by a dotted pattern. The sensing environment 30 encompasses a local sensing environment 30a near the surface 31 of the sensing layer 15 and a further sensing environment 30b. The further sensing environment 30b encompasses the wider or in other words larger area of the sensor and may also be denoted as wider, remote or distant sensing environment. In FIG. 2 the further sensing area 30b is illustrated with a lower density of dots than the local sensing environment 30a. The surface 31 of the sensing layer 15 establishes an interface between the sensing layer 15 and the sensing environment 30. Accordingly, the surface 31 may be also denoted as environmental interface 31.

The environmental air interacts with the sensing layer 15, in particular via the surface 31 of the sensing layer 15. More particularly, humidity of the environmental air diffuses into the sensing layer 15 and thereby changes the permittivity of the sensing layer 15 between adjacent electrodes 11 and 12 and thereby the capacitance of the electrode structure 10. This capacitance change may be measured in order to sense the humidity of the environmental air 30. In other words, the humidity sensor 100 derives the humidity of the environmental air or more generally of the gaseous environment which surrounds the humidity sensor 100 from the capacitance of the electrode structure 10.

For such a measurement, a measurement circuit may be connected to the first electrodes 11 and the second electrodes 12.

FIG. 2 shows a partial cross sectional view 200 of a humidity sensor, more particularly a cut-out section 101 of the sensor 100 as shown in FIG. 1 including a schematic illustration of the capacitances to be considered for measurement approaches according to embodiments of the invention.

Figure 3:
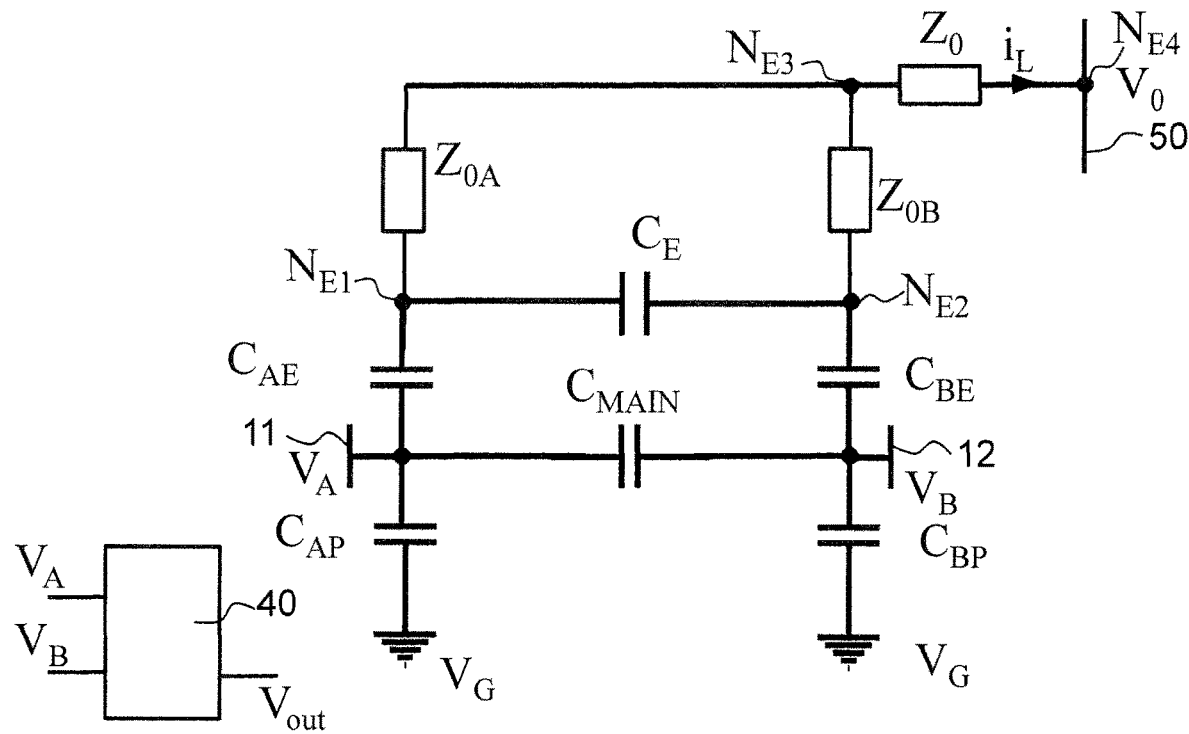
FIG. 3 shows a corresponding schematic electrical equivalent circuit of the partial cross sectional view of FIG. 2.

FIG. 3 shows a corresponding schematic electrical equivalent circuit 300 of the partial cross sectional view 200 of FIG. 2.

The partial cross sectional view 200 and the electrical equivalent circuit 300 comprise a main capacitance $C_{MAIN}$ between the first electrode A and the second electrode B. The first electrode A is coupled to an electrical potential $V_A$ and the second electrode B to an electrical potential $V_B$.

The partial cross sectional view 200 and the electrical equivalent circuit 300 comprises a capacitance $C_{AE}$ between the first electrode 11 and a first reference node $N_{E1}$ on the surface 31 of the sensing layer 15 and a capacitance $C_{BE}$ between the second electrode 12 and a second reference node $N_{E2}$ on the surface 31 of the sensing layer 15. In other words, the capacitance $C_{AE}$ may also be defined as the mutual capacitance between the first electrode 11 and a virtual electrode arranged on the surface 31 of the sensing layer 15, while $C_{BE}$ may also be defined as the capacitance between the second electrode 12 and the virtual electrode.

The capacitance $C_{AE}$ may be denoted as interface capacitance $C_{AE}$ and the capacitance $C_{BE}$ as interface capacitance $C_{BE}$. The electrical equivalent circuit 300 comprises a parasitic capacitance $C_{AP}$ between the electrode A and a fix potential $V_G$ of electrode 23, in particular to ground potential, and a parasitic capacitance $C_{BP}$ between the electrode B and the fix potential $V_G$ of electrode 23, in particular to the ground potential.

In addition, the electrical equivalent circuit 300 comprises an environmental capacitance $C_E$. The environmental capacitance $C_E$ may be considered as a capacitance between two fictive "points" of the sensing environment 30, in particular between two fictive points on or on top of the surface 31 of the sensing layer 15, in particular between the reference nodes $N_{E1}$ and $N_{E2}$. The environmental capacitance may be also denoted as surface capacitance.

In addition, the electrical equivalent circuit 300 comprises an impedance $Z_{0A}$ between the first reference node $N_{E1}$ and a third reference node $N_{E3}$ and an impedance $Z_{0B}$ between the second reference node $N_{E2}$ and the third reference node $N_{E3}$. The third reference node $N_{E3}$ is also a fictive node which is coupled to a floating electrical potential $V_E$. The impedance $Z_{0A}$ and the impedance $Z_{0B}$ may be resistive, capacitive and/or inductive and may be considered as local impedances of the local sensing environment 30a near the surface 31 of the sensing layer 15. The impedances $Z_{0A}$ and $Z_{0B}$ may change independently from $C_{MAIN}$, $C_{AE}$ and $C_{BE}$.

In addition, the electrical equivalent circuit 300 comprises an impedance $Z_0$ between the third reference node $N_{E3}$ and a fourth reference node $N_{E4}$. The fourth reference node $N_{E4}$ is also a fictive node which is coupled to an electrical potential $V_0$. The impedance $Z_0$ may be considered as an impedance between the local sensing environment 30a near the surface 31 of the sensing layer 30 and the further sensing environment 30b of the sensor 100. The impedance $Z_0$ may change independently from $C_{MAIN}$, $C_{AE}$, $C_{BE}$, $Z_{0A}$ und $Z_{0B}$. The electrical potential $V_0$ may be considered as a defined remote electrical potential of the sensor. In particular, it may be defined as the average electrical potential of electrical structures 50 surrounding the surface 31 of the sensing layer 15. The electrical structures 50 surrounding the surface 31 of the sensing layer 15 are collectively illustrated with a single line. The electrical structures 50 may encompass e.g. electrical lines, electronic circuitry or any other electrical structures of the sensor towards which leakage currents $I_L$ may occur via the sensing environment 30 in case of a condensation or contamination of the surface of the sensing layer.

According to embodiments, the virtual electrode may be considered as an electrode that may be used to measure $C_{AE}$ and $C_{BE}$ by short-circuiting $C_E$. Accordingly, for such a measurement one may assume that $Z_{0A}=Z_{0B}=Z_0=0$ and $N_{E1}=N_{E2}=N_{E3}$. The short-circuiting may be performed e.g. by applying a conductive layer on the surface of the sensing layer.

According to embodiments of the invention, a measurement circuit 40 is provided which measures the permittivity of the sensing layer 15 by applying, at a first measurement phase, a first pair of electrical potentials to the first electrode A and the second electrode B. Then, at a second measurement phase, the measurement circuit 40 applies a second pair of electrical potentials to the first electrode A and the second electrode B.

In the following with reference to FIGS. 4, 5 and FIG. 6 three different measurement scenarios are considered.

Figure 4:
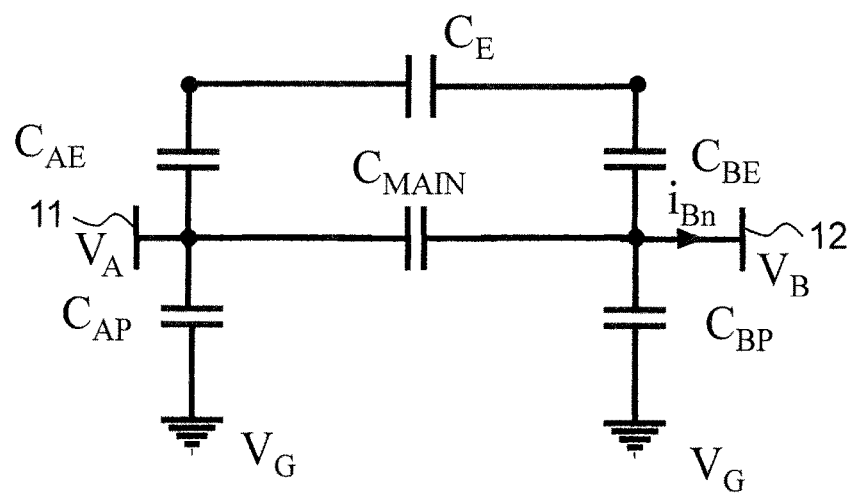
FIG. 4 shows an electrical equivalent circuit representing a "normal" measurement scenario without a substantial contamination or condensation of the surface of the sensing layer.

More particularly, FIG. 4 shows an electrical equivalent circuit representing a "normal" or in other words regular measurement scenarios without a substantial contamination or condensation of the surface 31 of the sensing layer 15. For this case it is generally assumed that the absolute value of $Z_{0A}$, $Z_{0B}$, $Z_0 \gg \max(1/(w*C_E), 1/(w*C_{AE}), 1/(w*C_{BE}))$, wherein w is the excitation frequency of the first electrode and the second electrode. This assumption may be further simplified to the assumption that $$Z_{0A}=Z_{0B}=Z_0=\infty.$$

The latter assumption results then in the simplified electrical equivalent circuit 400. Accordingly, the first electrode 11 and the second electrode 12 are electrically connected by a parallel arrangement of the main capacitance $C_{MAIN}$ and a serial arrangement of $C_{AE}$, $C_{BE}$ and $C_E$.

The current $i_{bn}$ flowing to the second electrode 12 in this normal case may then be calculated as follows:

$$i_{Bn} = \frac{d}{dt}\left((V_A - V_B)\left(C_{MAIN} + \frac{C_{AE}C_{BE}C_E}{C_{AE}C_{BE} + C_{AE}C_E + C_{BE}C_E}\right) + (V_G - V_B)C_{BP}\right)$$

The term d/dt generally denotes the derivative of the applied voltages $V_A$ and $V_B$. In the case of a two phase measurement with fixed voltages being applied during the two phases it denotes the difference between the voltages being applied at the two phases.

As can be seen from the above formula, by changing the electrical potential of both the first electrode and the second electrode, the current $i_{bn}$ and hence the sensor signal or in other words the sensing signal of the measurement circuit may be increased.

For the following further considerations an initial assumption as follows shall be made.

$$\frac{d}{dt}V_A \geq 0 \text{ and } \frac{d}{dt}V_B \leq 0.$$

This will facilitate the considerations of the relational operators $\geq$ and $\leq$.

However, it should be noted that equivalent considerations may be made for the opposite assumptions, namely that $$\frac{d}{dt}V_A \leq 0 \text{ and } \frac{d}{dt}V_B \geq 0.$$

In the latter case the corresponding signs and relational operators have also to be inverted.

Figure 5:
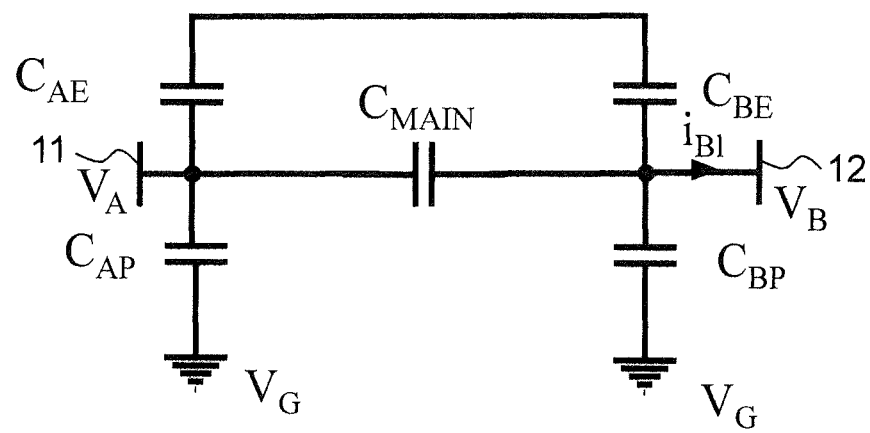
FIG. 5 shows an electrical equivalent circuit representing a "local" contamination or condensation scenario of the surface of the sensing layer.

FIG. 5 shows an electrical equivalent circuit representing a contamination or condensation scenario assuming a local or small scale contamination or condensation of the surface 31 of the sensing layer 15. For such a local contamination or condensation scenario it is generally assumed that the absolute value of $Z_{0A}$ and $Z_{0B} \ll 1/(w*C_E)$, wherein w is the excitation frequency of the first electrode and the second electrode and that the absolute value of $Z_0 \gg Z_{0A}, Z_{0B}$. This may be further simplified to $$Z_{0A}=Z_{0B}=0; \text{ and}$$

$$Z_0=\infty.$$

The latter assumption results then in the simplified electrical equivalent circuit 500. Accordingly, the first electrode 11 and the second electrode 12 are electrically connected by a parallel arrangement of the main capacitance $C_{MAIN}$ and a serial arrangement of $C_{AE}$ and $C_{BE}$.

The current $i_{B1}$ flowing to the second electrode 12 in this local contamination scenario may then be calculated as follows:

$$i_{Bl} = \frac{d}{dt}\left((V_A - V_B)\left(C_{MAIN} + \frac{C_{AE}C_{BE}}{C_{AE} + C_{BE}}\right) + (V_G - V_B)C_{BP}\right).$$

Hence in this scenario $i_{B1} > i_{Bn}$.
More particularly, $$\frac{C_{AE}C_{BE}}{C_{AE} + C_{BE}} > \frac{C_{AE}C_{BE}C_E}{C_{AE}C_{BE} + C_{AE}C_E + C_{BE}C_E}.$$

Hence there is one capacitance less, namely $C_E$, in the serial arrangement, which results in a larger total capacitance.

In the example of a humidity sensor having a local condensation on the surface of the sensing layer, an increase of the current at the second electrode would be interpreted as larger capacitance and hence as larger humidity. This would still not cause any problems as such local condensation could be interpreted as maximum humidity. Hence this case may be disregarded for the following considerations.

Figure 6:
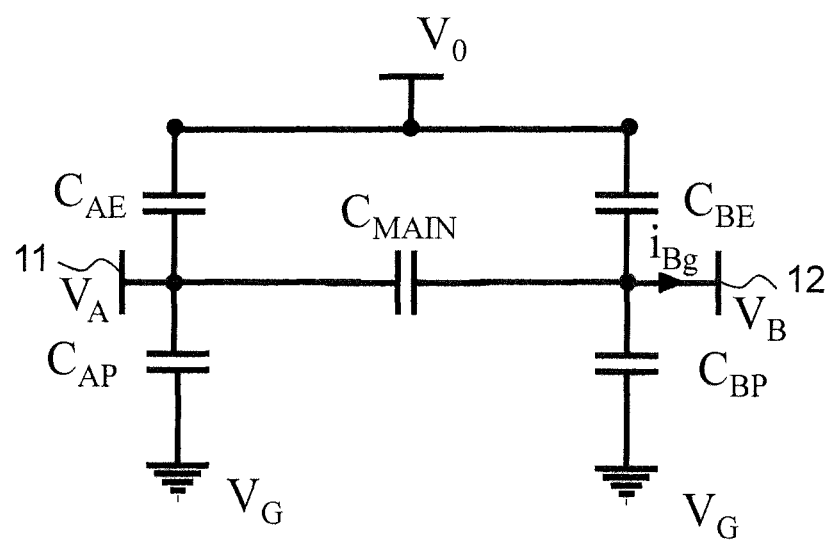
FIG. 6 shows an electrical equivalent circuit representing a "global" contamination or condensation scenario involving large scale contamination or condensation of the surface of the sensing layer.

FIG. 6 shows an electrical equivalent circuit representing a contamination or condensation scenario assuming a large area or large scale contamination or condensation of the surface 31 of the sensing layer 15. Such a large area contamination or condensation encompasses in particular contamination or condensation scenarios which extend beyond the sensing layer 15 and hence may result in leakage currents to the electrical structures 50 surrounding the sensing layer 15. For this case it is generally assumed that the absolute value of $Z_{0A}$, $Z_{0B}$, $Z_0 \ll 1/(w*C_E)$, wherein w is the excitation frequency of the first electrode and the second electrode. This assumption may be further simplified to the assumption that $Z_{0A} = Z_{0B} = Z_0 = 0$.

The latter assumption results then in the simplified electrical equivalent circuit 500, wherein $C_E$ is short-circuited.

The current $i_{Bg}$ flowing to the second electrode 12 may then be calculated as follows:

$$I_{Bg} = \frac{d}{dt}((V_A - V_B)C_{MAIN} + (V_0 - V_B)C_{BE} + (V_G - V_B)C_{BP});$$

Hence $i_{Bg}$ becomes independent of $C_{AE}$ and the current through $C_{BE}$ depends only on $$\frac{d}{dt}(V_0 - V_B),$$

but not anymore on $$\frac{d}{dt}V_A.$$

According to embodiments of the invention, for the electrode current $i_B$ of the second electrode a condition as follows is desired:

$i_{Bg} \geq i_{Bn}$.

In other words, the current at the second electrode 12 shall be higher in the case of large area contaminations or large area condensations ("global contaminations") than in the normal measurement scenario. Hence the sensor would deliver a larger sensor signal in case of large contamination/condensation. For the following considerations it is assumed that $$\frac{d}{dt}V_0 = 0$$

In other words, it is assumed that $V_0$ remains constant over time. This may be e.g. achieved by a suitable arrangement of the electrical circuits, lines and wires of the electrical structures 50 in the surrounding of the electrode structure as known to an electronic circuit design engineer. In particular, it may be achieved by avoiding to place clocked lines near the electrode structure and in particular near the surface of the sensor chip. The above mentioned condition may then be further specified as follows:

$i_{Bn} \leq i_{Bg}$ $$\frac{d}{dt}\left((V_A - V_B)\left(C_{MAIN} + \frac{C_{AE}C_{BE}C_E}{C_{AE}C_{BE} + C_{AE}C_E + C_{BE}C_E}\right) + (V_G - V_B)C_{BP}\right) \leq$$

$$\frac{d}{dt}((V_A - V_B)C_{MAIN} + (V_0 - V_B)C_{BE} + (V_G - V_B)C_{BP})$$

$$\frac{d}{dt}(V_A - V_B)\frac{C_{AE}C_{BE}C_E}{C_{AE}C_{BE} + C_{AE}C_E + C_{BE}C_E} \leq -\frac{d}{dt}V_B C_{BE}$$

$$\frac{d}{dt}V_A \frac{C_{AE}C_{BE}C_E}{C_{AE}C_{BE} + C_{AE}C_E + C_{BE}C_E} \leq$$

$$\frac{d}{dt}V_B\left(\frac{C_{AE}C_{BE}C_E}{C_{AE}C_{BE} + C_{AE}C_E + C_{BE}C_E} - C_{BE}\right)$$

$$\frac{d}{dt}V_A \leq \frac{d}{dt}V_B\left(1 - C_{BE}\frac{C_{AE}C_{BE} + C_{AE}C_E + C_{BE}C_E}{C_{AE}C_{BE}C_E}\right)$$

$$\frac{d}{dt}V_A \leq \frac{d}{dt}V_B\left(1 - \frac{C_{AE}C_{BE} + C_{AE}C_E + C_{BE}C_E}{C_{AE}C_E}\right)$$

$$\frac{d}{dt}V_A \leq -\frac{d}{dt}V_B\left(\frac{C_{BE}}{C_E} + \frac{C_{BE}}{C_{AE}}\right)$$

Generally $C_{BE}/C_E$ is unknown, changes with the permittivity of the sensing layer and also depends on the permittivity of the sensing environment. For unknown $C_{BE}/C_E$, the hardest condition for $$\frac{d}{dt}V_A$$

is $C_{BE}/C_E = 0$ or $C_E = \infty$, and the condition further simplifies to $$\frac{d}{dt}V_A \leq -\frac{d}{dt}V_B \frac{C_{BE}}{C_{AE}}$$

together with the initial assumptions $$\frac{d}{dt}V_A \geq 0 \text{ and } \frac{d}{dt}V_B \leq 0.$$

The quotient $C_{BE}/C_{AE}$ is determined by the geometry of the electrode structure. It does not change over time and also does not change in dependence on the measurand.

For the two-phase measurement comprising the first measurement phase and the second measurement phase provided according to embodiments of the invention, the above condition may be then expressed as follows.

$0 \leq (V_{A1} - V_{A2}) \leq (V_{B2} - V_{B1}) * C_{BE}/C_{AE};$ (Inequality 1)

or $$(V_{B2}-V_{B1})*C_{BE}/C_{AE} \leq (V_{A1}-V_{A2}) <= 0. \quad \text{(Inequality 2)}$$

In the above formula $V_{A1}$ denotes the first electrical potential of the first electrode 11 at the first measurement phase, $V_{A2}$ is the second electrical potential of the first electrode 11 at the second measurement phase, $V_{B1}$ is the first electrical potential of the second electrode 12 at the first measurement phase and $V_{B2}$ is the second electrical potential of the second electrode 12 at the second measurement phase. $V_{A1}$, $V_{A2}$, $V_{B1}$ and $V_{B2}$ are reached at the end of the respective measurement phase. The transition from the first to the second measurement phase can have an arbitrary course.

According to embodiments, the above set of conditions include a condition as follows:

$$(V_{A1}-V_{A2})=(V_{B2}-V_{B1})*C_{BE}/C_{AE}$$

In the special case of a symmetric arrangement of the first electrode 11 and the second electrode 12, in particular in case that the first electrode 11 and the second electrode 12 have the same distance to the surface 31 of the sensing layer 15, the quotient $C_{BE}/C_{AE}=1$. Accordingly, the above condition for such a symmetric arrangement of the electrodes may be denoted as $$(V_{A1}-V_{A2})=(V_{B2}-V_{B1}).$$

In other words, the average electrical potential of the first pair of electrical potentials is the same as the average electrical potential of the second pair of electrical potentials.

In other words, the average potential of electrode A and B is kept constant during the first measurement phase and the second measurement phase.

As the potential on electrode B varies between the first measurement phase and the second measurement phase, the parasitic capacitance $C_{BP}$ is also measured assuming that the electrodes 23 are on ground potential.

The quotient $C_{BE}/C_{AE}$ may be determined in several different ways. As mentioned above, such a determination is only needed in case of asymmetric electrode arrangements, while in symmetric electrode arrangements the quotient is 1.

According to an embodiment, the quotient $C_{BE}/C_{AE}$ may be determined by a simulation according to the finite element method (FEM), e.g. by the Comsol Multiphysics® software. For such a simulation a virtual electrode on the surface 31 of the sensing layer 15 is provided.

According to other embodiments, the quotient $C_{BE}/C_{AE}$ may be determined by measurements, e.g. by measurements based on a capacitive voltage divider formed by the capacitances $C_{AE}$ and $C_{BE}$.

Figure 10:
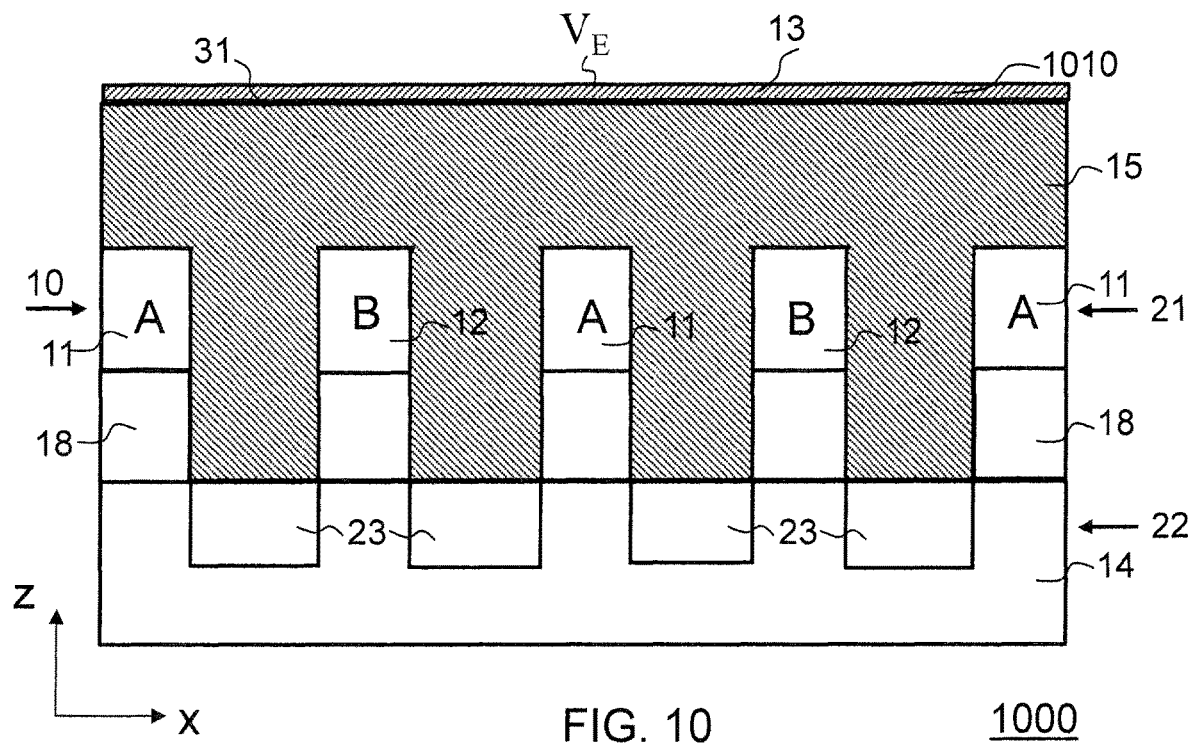
FIG. 10 shows a cross sectional view of a capacitive sensor of a measurement arrangement according to an embodiment of the invention.

The latter embodiment will be described in more detail in the following with reference to FIGS. 10 and 11. FIG. 10 shows a cross sectional view of a capacitive sensor 1000, which essentially corresponds to the sensor 100 of FIG. 1. The sensor 1000 however comprises a conductive layer 1010 on the surface 31 of the sensing layer 15. The sensor 1000 establishes an exemplary measurement arrangement for measuring the quotient $C_{AE}/C_{BE}$. The conductive layer 1010 establishes a virtual electrode 13. The virtual electrode 13 may be considered as a measurement electrode, in particular an auxiliary measurement electrode for measuring the quotient $C_{AE}/C_{BE}$. The conductive layer 1010 may be e.g. a layer of metal that has been applied by spraying or sputtering. According to embodiments, such a layer may be e.g. a sputtered gold layer (AU layer) having a thickness of e.g. 100 nm. The gold layer may be connected to an existing pad that can be wire bonded or contacted with probes.

The conductive layer 1010 may be applied only once or only for one sample sensor in order to determine the quotient $C_{BE}/C_{AE}$ for a corresponding series of sensors. The measurement may be performed in a lab environment. As mentioned, such a method is in particular useful for asymmetric electrode arrangements, while for symmetric arrangements the quotient $C_{BE}/C_{AE}$ may be assumed to be 1.

Figure 11:
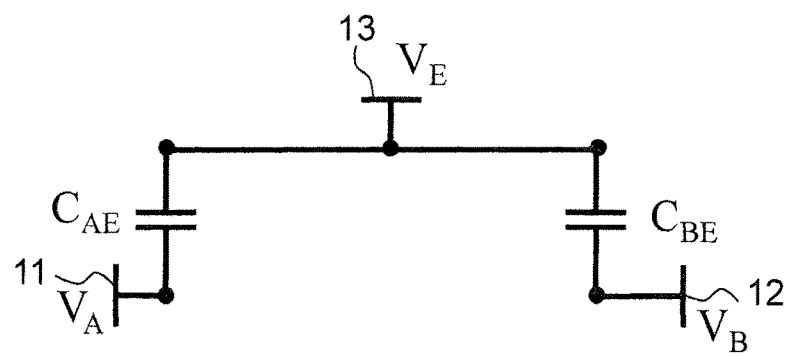
FIG. 11 shows a corresponding electrical equivalent circuit of the exemplary measurement arrangement of FIG. 10.

FIG. 11 shows a corresponding electrical equivalent circuit of the exemplary measurement arrangement. Compared with the equivalent circuit of FIG. 6, the electrical equivalent circuit of FIG. 11 does not comprise the capacitances $C_{MAIN}$, $C_{AP}$ and $C_{BP}$. The latter capacitances may be neglected or omitted as the first electrode 11 and the second electrode 12 are operated for the measurement at defined voltage potentials.

At a first measurement step, a predefined set of voltages $V_{A1}$ and $V_{B1}$ is applied to the first electrode 11 and the second electrode 12 respectively. According to embodiments, $V_{A1}$ and $V_{B1}$ are chosen as follows:

$$V_{A1}=V_{B1}=0 \text{ V}.$$

Then the potential $V_{E1}$ of the conductive layer 1010 is measured.

In a further step (second step) another (different) set of voltages $V_{A2}$ and $V_{B2}$ is applied to the first electrode 11 and the second electrode 12 respectively, wherein the set of voltages is in particular chosen such that $V_{A2}=-V_{B2}$, e.g. $V_{A2}=1$ V and $V_{B2}=-1$ V. Then the change of the voltage potential of the conductive layer 1010, namely $V_{E2}$ is measured which is determined by the capacitive voltage divider of $C_{AE}$ and $C_{BE}$.

As the capacitances $C_{AE}$ and $C_{BE}$ are arranged in series, the corresponding charges $Q_{CAE}$ and $Q_{CBE}$ on the capacitances $C_{AE}$ and $C_{BE}$, in particular the charge differences $\Delta Q_{AE}$ and $\Delta Q_{BE}$ are equal to each other.

Accordingly, $$\Delta Q_{AE}=C_{AE}*(\Delta V_A - \Delta V_E) = \Delta Q_{BE}=C_{BE}*(\Delta V_E - \Delta V_B),$$

wherein $$\Delta V_A=(V_{A2}-V_{A1}), \Delta V_B=(V_{B2}-V_{B1}), \Delta V_E=(V_{E2}-V_{E1}).$$

Hence, the quotient $C_{BE}/C_{AE}$ may be determined as $$C_{BE}/C_{AE}=(\Delta V_A - \Delta V_E)/(\Delta V_E - \Delta V_B).$$

According to yet another embodiment, one may not measure the quotient $C_{BE}/C_{AE}$ directly, but rather indirectly.

More particularly, one may perform two measurements, a first measurement where the sensing environment provides a relative humidity of 100% or app. 100%. Such a relative humidity can be provided e.g. with an appropriate laboratory equipment, e.g. by slowly cooling down a sealed environment (e.g. a sealed box that contains the sensor), until condensation occurs. By continuously measuring the sensor capacitance, one can determine the difference in the sensors signal just before and after condensation. Such a procedure should be repeated for different levels of VA1, VA2, $V_B1$ and $V_B2$.

In addition, a second measurement is performed where a condensation layer is applied to the sensing layer 30 corresponding to the global contamination/condensation scenario as shown in FIG. 6. Such a condensation layer may be applied e.g. by applying a thin layer of water on the sensing layer 30.

According to embodiments, the voltage potentials $V_{A1}$, $V_{A2}$, $V_{B1}$ and $V_{B2}$ are then chosen by experiment/trial in such a way that the resulting charge difference at the second electrode is the same for the measurement at a relative humidity of 100% and for the measurement at the global contamination/condensation scenario.

Hence in the inequality 1 e.g. the inequality sign may be replaced by an equality sign and the quotient $C_{BE}/C_{AE}$ may be derived as follows:

$$(V_{A1}-V_{A2})=(V_{B2}-V_{B1})*C_{BE}/C_{AE}.$$

This may be rewritten to:

$$C_{BE}/C_{AE}=(V_{A1}-V_{A2})/(V_{B2}-V_{B1})$$

It should be noted that in order to ensure that the inequalities 1 or 2 are fulfilled, it is not necessary according to embodiments to determine the quotient $C_{BE}/C_{AE}$ in a precise or exact manner. Rather, one may perform a rough estimation of the quotient $C_{BE}/C_{AE}$ and choose then e.g. in the inequalities 1 or 2 as mentioned above the voltage values such that the inequality is fulfilled even in a worst case scenario of the estimation.

As an example, let us assume that in the inequality 1 $V_{A1}=2V$, $V_{A2}=1V$, and the estimated value of the quotient $C_{BE}/C_{AE}=0.75$. Then one could e.g. choose the difference $V_{B2}-V_{B1}$ sufficiently large, e.g. 3V, so that in any case the product $(V_{B2}-V_{B1})*C_{BE}/C_{AE} \geq 1V$. In the example of 3V for the difference $(V_{B2}-V_{B1})$, inequality 1 would even be fulfilled for a quotient $C_{BE}/C_{AE}=0.34$ instead of the estimated value of 0.75.

Figure 7A:
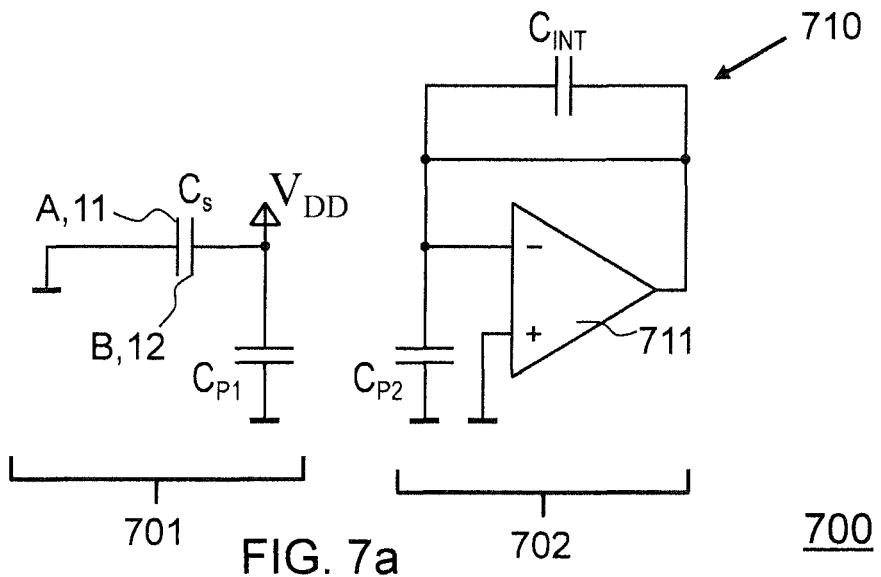
FIG. 7a shows a measurement circuit for measuring the capacitance of the electrode structure of sensors according to an embodiment of the invention at a first measurement phase.
Figure 7B:
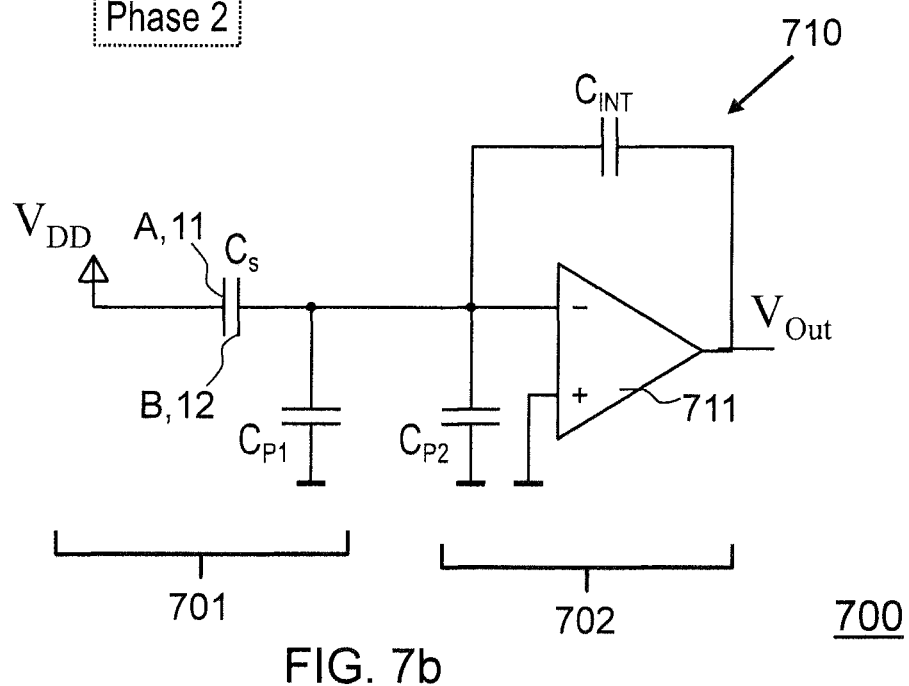
FIG. 7b shows the measurement circuit of FIG. 5a at a second measurement phase.

FIG. 7a and FIG. 7b show a measurement circuit 700 for measuring the capacitance of the sensing layer of sensors according to embodiments of the invention, e.g. of the sensor of FIG. 1. More particularly, FIG. 7a shows the measurement circuit 700 at the first measurement phase and FIG. 7b the measurement circuit 700 at the second measurement phase.

The measurement circuit 700 comprises a first circuit part 701 and a second circuit part 702.

The first circuit part 701 comprises the electrode arrangement with the first electrode A/11, the second electrode B/12 and the sensing layer in between. The left circuit part 701 furthermore comprises a voltage generator, which is not shown as such, but only the voltages provided. The voltage generator of the measurement circuit 700 provides at the first measurement phase an electrical potential $V_{DD}$ to the second electrode B of the electrode structure and a ground potential to the first electrode A. The capacitance to be sensed is denoted with $C_S$. Between the second electrode B and ground there is arranged a parasitic capacitance $C_{P1}$.

The second circuit part 702 forms an integrator 710, in particular a switched capacitor amplifier. The integrator 710 is configured to integrate a resulting charge difference as will be explained below. The integrator 710 is embodied as switched capacitor amplifier and comprises an operational amplifier 711. The positive input of the operational amplifier 711 is coupled to ground. A feedback path couples the output of the operational amplifier 711 via an integrating capacitor $C_{INT}$ to the negative (inverting) input of the operational amplifier 711. The integrating capacitor $C_{INT}$ may also be denoted as reference capacitor. The negative input is coupled via a parasitic capacitance $C_{P2}$ to ground. In the first measurement phase the integrating capacitor $C_{INT}$ is short circuited. Furthermore, the second circuit part 702 is not connected to the first circuit part 701 during the first measurement phase.

At the second measurement phase as shown in FIG. 7b, the voltage generator of the measurement circuit provides an electrical potential $V_{DD}$ to the first electrode A of the electrode structure and a ground potential to the second electrode B. The second circuit part 702 is during the second measurement phase coupled to the first circuit part 701. More particularly, the negative input of the operational amplifier 711 is coupled to the second electrode B. Hence the ground potential of the second electrode B is provided by the virtual ground of the operational amplifier 711. Furthermore, the integrating capacitor $C_{INT}$ is not short-circuited anymore.

The measurement circuit 700 may be switched between the first measurement phase and the second measurement phase by appropriate switches as apparent to a skilled person in the art. The corresponding switches are not shown in FIG. 7a and FIG. 7b for ease of illustration.

In the second measurement phase as illustrated in FIG. 7b, the measurement circuit 700 is configured to transfer a resulting charge difference that results at the second electrode B to the integrating capacitor $C_{INT}$. In other words, the integrator 710 integrates a current flowing through the first electrode and the second electrode during the second measurement phase.

The integrating capacitor $C_{INT}$ forms a reference capacitor.

The measurement circuit 700 provides a resulting voltage $V_{out}$ at the reference capacitor $C_{INT}$ and the output of the operational amplifier 711. The resulting voltage $V_{out}$ may then be used by the sensor to determine the permittivity of the sensing layer and a corresponding relative humidity.

Figure 8A:
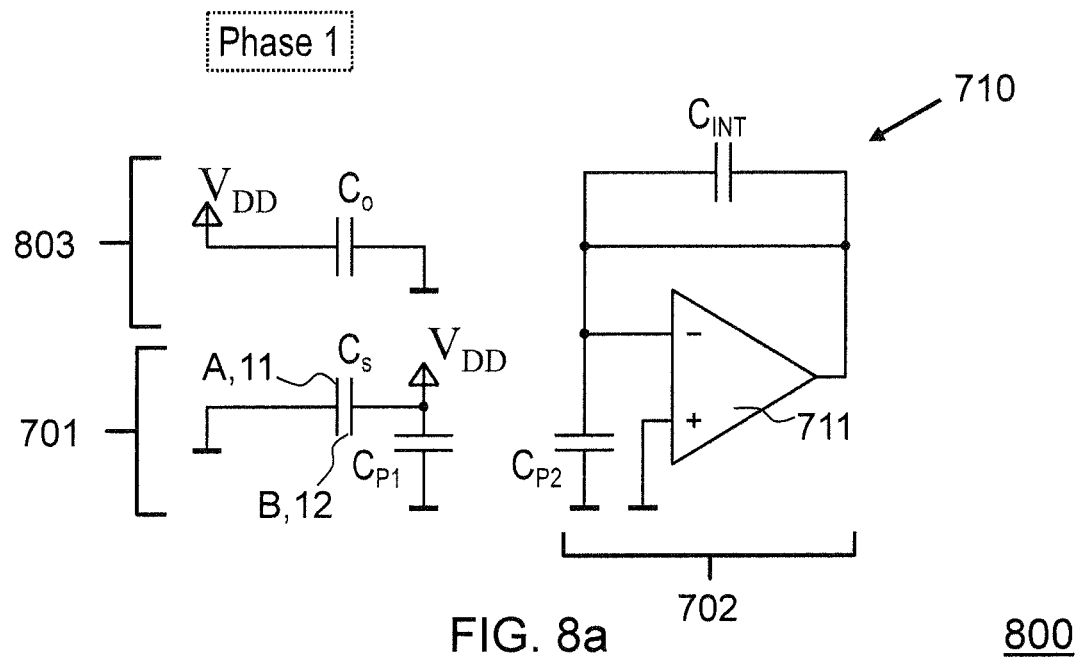
FIG. 8a shows a measurement circuit for measuring the capacitance of the electrode structure of sensors according to another embodiment of the invention at a first measurement phase.
Figure 8B:
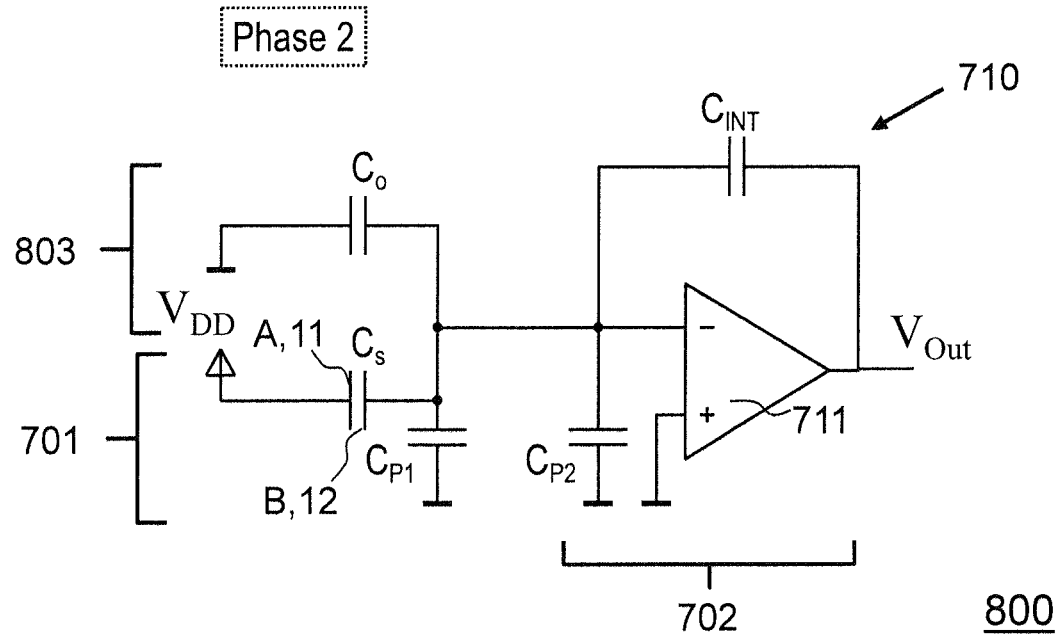
FIG. 8b shows the measurement circuit of FIG. 6a at a second measurement phase.

FIG. 8a and FIG. 8b show a measurement circuit 800 for measuring the permittivity of the sensing layer of sensors according to embodiments of the invention, e.g. of the sensor of FIG. 1. More particularly, FIG. 8a shows the measurement circuit 800 at the first measurement phase and FIG. 8b the measurement circuit 800 at the second measurement phase.

The measurement circuit 800 comprises a first circuit part 701, a second circuit part 702 and a third circuit part 803. The circuit parts 701 and 702 correspond to the circuit parts 701 and 702 as shown and described with reference to FIG. 7a and FIG. 7b.

The third circuit part 803 comprises an offset capacitance $C_O$. In the first measurement phase the offset capacitance $C_O$ is charged with the voltage $V_{DD}$ to an offset charge $Q_O$.

At the second measurement phase, the offset capacitance $C_O$ is coupled between ground and the negative input of the operational amplifier 711. Accordingly, the measurement circuit 800 is configured to subtract the offset charge $Q_O$ from the resulting charge difference. This provides the advantage that the resulting charge difference may be measured in a symmetric way. More particularly, the integrating capacity $C_{INT}$ may be charged with a charge signal $Q_{sense}-Q_0$ symmetric to 0. More particularly, $(Q_{sense\_max}-Q_0)=-(Q_{sense\_min}-Q_0)$.

Figure 9:
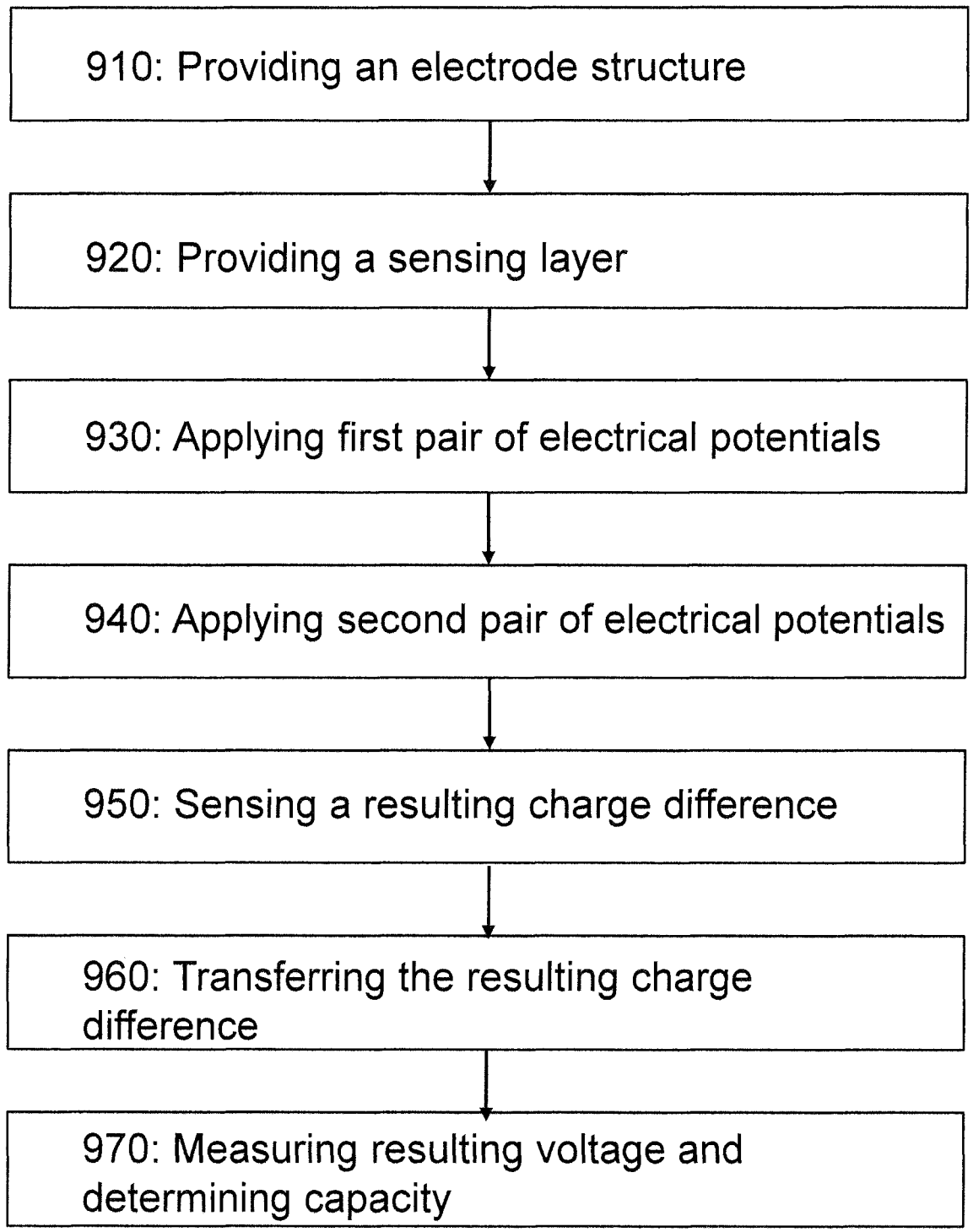
FIG. 9 illustrates a flow chart of method steps of a method for performing a humidity measurement.

FIG. 9 illustrates a flow chart of method steps of a method for performing a relative humidity measurement. The method may be e.g. performed with sensors according to embodiments of the invention as described above.

At a step 910, an electrode structure is provided which comprises at least a first electrode and a second electrode.

At a step 920, a sensing layer is provided. The sensing layer is arranged between the first electrode and the second electrode and has a humidity sensitive permittivity. The first electrode, the sensing layer and the second electrode form a capacitor.

At a step 930, a first measurement phase is performed and a first pair of electrical potentials is applied to the first electrode and the second electrode.

At a step 940, a second measurement phase is performed and a second pair of electrical potentials is applied to the first electrode and the second electrode.

The first pair of electrical potentials comprises a first electrical potential of the first electrode and a first electrical potential of the second electrode. The second pair of electrical potentials comprises a second electrical potential of the first electrode and a second electrical potential of the second electrode. The first electrical potential of the second electrode and the second electrical potential of the second electrode are different from each other.

At a step 950, a resulting charge difference between the first measurement phase and the second measurement phase at the second electrode is sensed by a measurement circuit, in particular a readout circuit. More particularly, a change in the charge of the capacitor between the first measurement phase and the second measurement phase results in a current through the first electrode and the second electrode. The current in the second electrode is integrated, resulting in a charge difference seen on the capacitor.

At a step 960, the resulting charge difference is transferred to a reference capacitor, in particular to a capacitor having a known capacitance.

At a step 970, a resulting voltage is measured at the reference capacitor. By this measured voltage the capacitance of the electrode structure may be determined. The measured capacitance of the electrode structure is a measure of the humidity of the sensing environment.

Figure 12:
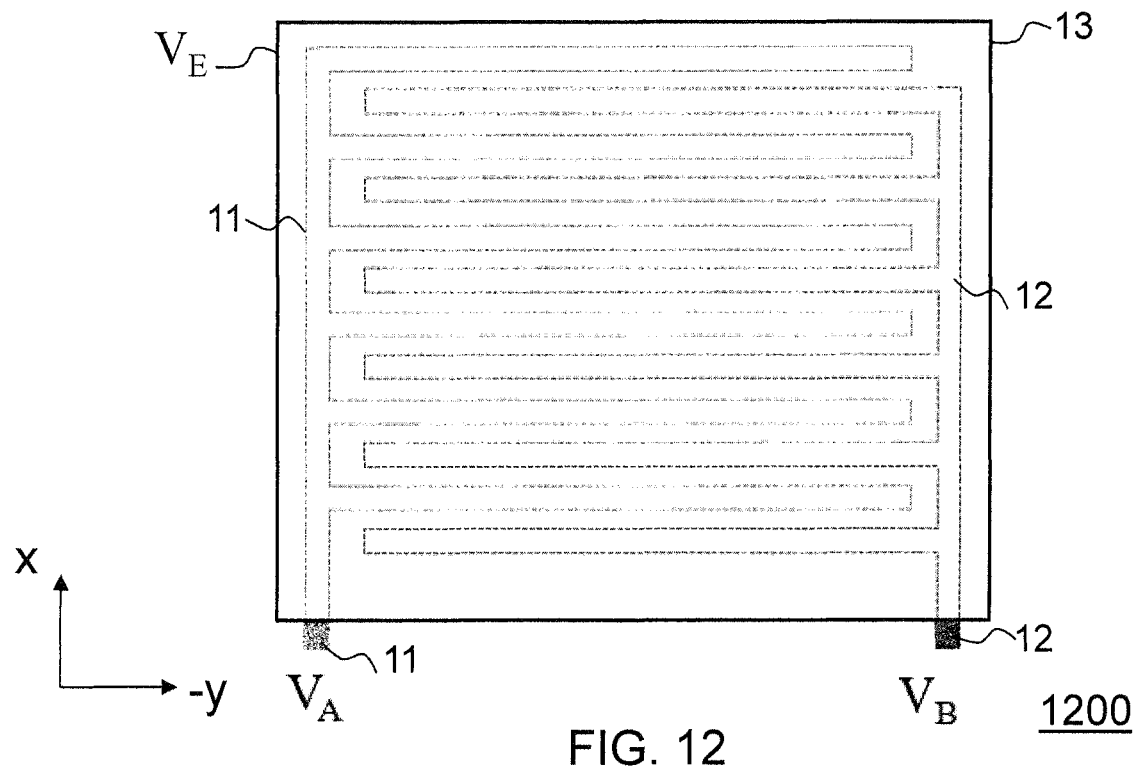
FIG. 12 shows a top view of the sensor of FIG. 10 forming an exemplary measurement arrangement for measuring a quotient $C_{AE}/C_{BE}$.

FIG. 12 shows a top view 1200 of the sensor 1000 of FIG. 10 forming an exemplary measurement arrangement for measuring the quotient $C_{AE}/C_{BE}$ according to an embodiment of the invention. The virtual electrode 13 which has been applied for measurement purposes covers the whole surface 31 of the sensing layer 15. The first electrode 11 and the second electrode 13 are arranged below the virtual electrode 13 and are embodied as interdigitated electrodes.

Figure 13:
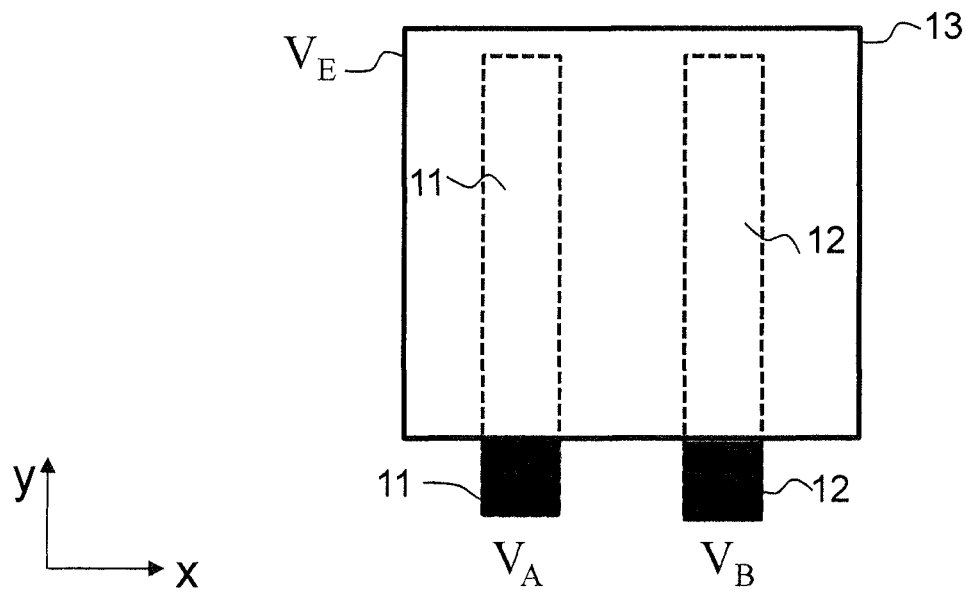
FIG. 13 shows a top view of another exemplary measurement arrangement for measuring the quotient $C_{AE}/C_{BE}$ of another electrode structure.

FIG. 13 shows a top view 1300 of an exemplary measurement arrangement for measuring the quotient $C_{AE}/C_{BE}$ according to another embodiment of the invention.

The measurement arrangement 1300 also comprises a virtual electrode 13 covering a sensing layer of a sensor according to an embodiment of the invention. However, in the embodiment of FIG. 13 the first electrode 11 and the second electrode 12 are not interdigitated electrodes, but have just a simple rectangular shape.

It should be noted that many other electrode structures may be used for the first electrode and the second electrode according to embodiments.

The invention claimed is:

1. A capacitive sensor comprising
a substrate;
an electrode structure comprising
at least a first electrode and a second electrode; and
a sensing layer arranged between the first electrode and the second electrode; and
a measurement circuit configured to
measure the capacitance of the electrode structure by
applying, at a first measurement stage, a first pair of electrical potentials comprising a first electrical potential of the first electrode applied to the first electrode and a first electrical potential of the second electrode applied to the second electrode; and
applying, at a second measurement stage, a second pair of electrical potentials comprising a second electrical potential of the first electrode applied to the first electrode and a second electrical potential of the second electrode applied to the second electrode;
wherein
the first electrical potential of the second electrode and the second electrical potential of the second electrode are different from each other; wherein
the first pair of electrical potentials and the second pair of electrical potentials are applied such that $$0<(V_{A1}-V_{A2})<=(V_{B2}-V_{B1})*C_{BE}/C_{AE}; \text{ or}$$

$$(V_{B2}-V_{B1})*C_{BE}/C_{AE}<=(V_{A1}-V_{A2})<0$$

wherein
$V_{A1}$ is the first electrical potential of the first electrode at the first measurement stage;
$V_{A2}$ is the second electrical potential of the first electrode at the second measurement stage;
$V_{B1}$ is the first electrical potential of the second electrode at the first measurement stage;
$V_{B2}$ is the second electrical potential of the second electrode at the second measurement stage;
$C_{AE}$ is a capacitance between the first electrode and a virtual electrode arranged on the surface of the sensing layer; and
$C_{BE}$ is a capacitance between the second electrode and the virtual electrode arranged on the surface of the sensing layer.

2. A sensor according to claim 1, wherein the first pair of electrical potentials and the second pair of electrical potentials are chosen such that leakage currents between the surface of the sensing layer and electrical structures surrounding the surface of the sensing layer are minimized.

3. A sensor according to claim 1,
wherein the first pair of electrical potentials and the second pair of electrical potentials are applied such that $$(V_{A1}-V_{A2})=(V_{B2}-V_{B1})*C_{BE}/C_{AE}$$

4. A sensor according to claim 1,
wherein an average electrical potential of the first pair of electrical potentials is the same as an average electrical potential of the second pair of electrical potentials.

5. A sensor according to claim 1, wherein the measurement circuit is configured to
sense a resulting charge difference between the first measurement stage and the second measurement stage at the second electrode.

6. A sensor according to claim 5, wherein the measurement circuit is configured to
transfer the resulting charge difference to a reference capacitor;
measure a resulting voltage at the reference capacitor; and
determine the capacitance of the electrode structure from the resulting voltage.

7. A sensor according to claim 5, wherein the measurement circuit is configured such that the resulting charge difference increases when condensation of a liquid, in particular water, occurs on the surface of the sensing layer and/or a contamination of the surface of the sensing layer occurs.

8. A sensor according to claim 5, wherein
the measurement circuit comprises an offset capacitor;
the measurement circuit is configured to subtract an offset charge from the resulting charge difference.

9. A sensor according to claim 5, wherein the measurement circuit comprises an integrator, in particular a switched capacitor amplifier, the integrator being configured to integrate the resulting charge difference.

10. A sensor according to claim 5, wherein the measurement circuit comprises switched capacitor circuitry and/or switched current circuitry for sensing the resulting charge difference.

11. A sensor according to claim 1, wherein the measurement circuit comprises switched capacitor circuitry and/or switched current circuitry for generating the first and the second pair of electrical potentials.

12. A sensor according to claim 1,
wherein
the first electrical potential of the first electrode is the same as second electrical potential of the second electrode; and
the first electrical potential of the second electrode is the same as the second electrical potential of the first electrode; and in particular wherein
the first electrical potential of the first electrode and the second electrical potential of the second electrode are supply voltage potentials; and
the first electrical potential of the second electrode and the second electrical potential of the first electrode are ground potentials; or in particular wherein the first electrical potential of the first electrode and the second electrical potential of the second electrode are ground potentials; and
the first electrical potential of the second electrode and the second electrical potential of the first electrode are supply voltage potentials.

13. A sensor according to claim 1, wherein the sensor comprises
a first metal layer comprising the first electrode and the second electrode; and
a second metal layer comprising a shielding structure.

14. A sensor according to claim 13, wherein the shielding structure is electrically coupled to
a fixed potential, in particular a ground potential or a supply potential;
the first electrode; or
the second electrode.

15. A sensor according to claim 1, wherein the sensor is a capacitive humidity sensor, a capacitive gas sensor or a capacitive particulate matter sensor.

16. A method for performing a capacitance measurement, the method comprising
providing an electrode structure comprising at least a first electrode and a second electrode and a sensing layer arranged between the first electrode and the second electrode;
measuring the capacitance of the electrode structure by
applying, at a first measurement stage, a first pair of electrical potentials comprising a first electrical potential of the first electrode applied to the first electrode and a first electrical potential of the second electrode applied to the second electrode; and
applying, at a second measurement stage, a second pair of electrical potentials comprising a second electrical potential of the first electrode applied to the first electrode and a second electrical potential of the second electrode applied to the second electrode;
wherein
the first electrical potential of the second electrode and the second electrical potential of the second electrode are different from each other;
wherein the first pair of electrical potentials and the second pair of electrical potentials are applied such that;

$$0 < (V_{A1} - V_{A2}) <= (V_{B2} - V_{B1}) * C_{BE}/C_{AE}; \text{ or}$$

$$(V_{B2} - V_{B1}) * C_{BE}/C_{AE} <= (V_{A1} - V_{A2}) < 0$$

wherein
$V_{A1}$ is the first electrical potential of the first electrode at the first measurement stage;
$V_{A2}$ is the second electrical potential of the first electrode at the second measurement stage;
$V_{B1}$ is the first electrical potential of the second electrode at the first measurement stage;
$V_{B2}$ is the second electrical potential of the second electrode at the second measurement stage;
$C_{AE}$ is a capacitance between the first electrode and a virtual electrode arranged on the surface of the sensing layer; and
$C_{BE}$ is a capacitance between the second electrode and a virtual electrode arranged on the surface of the sensing layer.

* * * * *